(12) United States Patent
Ehira

(10) Patent No.: US 11,335,029 B2
(45) Date of Patent: May 17, 2022

(54) ELECTRONIC DEVICE, METHOD FOR CONTROLLING ELECTRONIC DEVICE, AND STORAGE MEDIUM

(71) Applicant: CANON KABUSHIKI KAISHA, Tokyo (JP)

(72) Inventor: Tatsuya Ehira, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 47 days.

(21) Appl. No.: 17/073,081

(22) Filed: Oct. 16, 2020

(65) Prior Publication Data

US 2021/0125375 A1 Apr. 29, 2021

(30) Foreign Application Priority Data

Oct. 23, 2019 (JP) .............................. JP2019-192894

(51) Int. Cl.
*G06T 7/80* (2017.01)
*G06F 3/01* (2006.01)
*G06V 40/19* (2022.01)

(52) U.S. Cl.
CPC ................ *G06T 7/80* (2017.01); *G06F 3/013* (2013.01); *G06V 40/19* (2022.01)

(58) Field of Classification Search
CPC ............ G06T 7/80; G06V 40/19; G06F 3/013
See application file for complete search history.

(56) References Cited

U.S. PATENT DOCUMENTS

2015/0253971 A1* 9/2015 Nakamura ................ G09G 5/00
345/661
2015/0338915 A1* 11/2015 Publicover .............. G06F 21/64
345/633
2021/0125375 A1* 4/2021 Ehira ....................... G06F 3/013

FOREIGN PATENT DOCUMENTS

JP          05-088074 A       4/1993

* cited by examiner

*Primary Examiner* — Edward Park
(74) *Attorney, Agent, or Firm* — Canon U.S.A., Inc. I.P. Division

(57) ABSTRACT

An electronic device includes an eye gaze detection unit that detects a gaze position of a user, and a control unit that changes a luminance value of a background image displayed on a display unit in at least two steps. The control unit performs control to, when the luminance value is a first luminance value, change the luminance value from the first luminance value to a second luminance value after the eye gaze detection unit detects a plurality of gaze positions of the user including at least the gaze position of the user in a case where an item is displayed at a first position on the display unit and the gaze position of the user in a case where the item is displayed at a second position thereon. The eye gaze detection unit detects the gaze position of the user when the luminance value is the second luminance value.

17 Claims, 9 Drawing Sheets

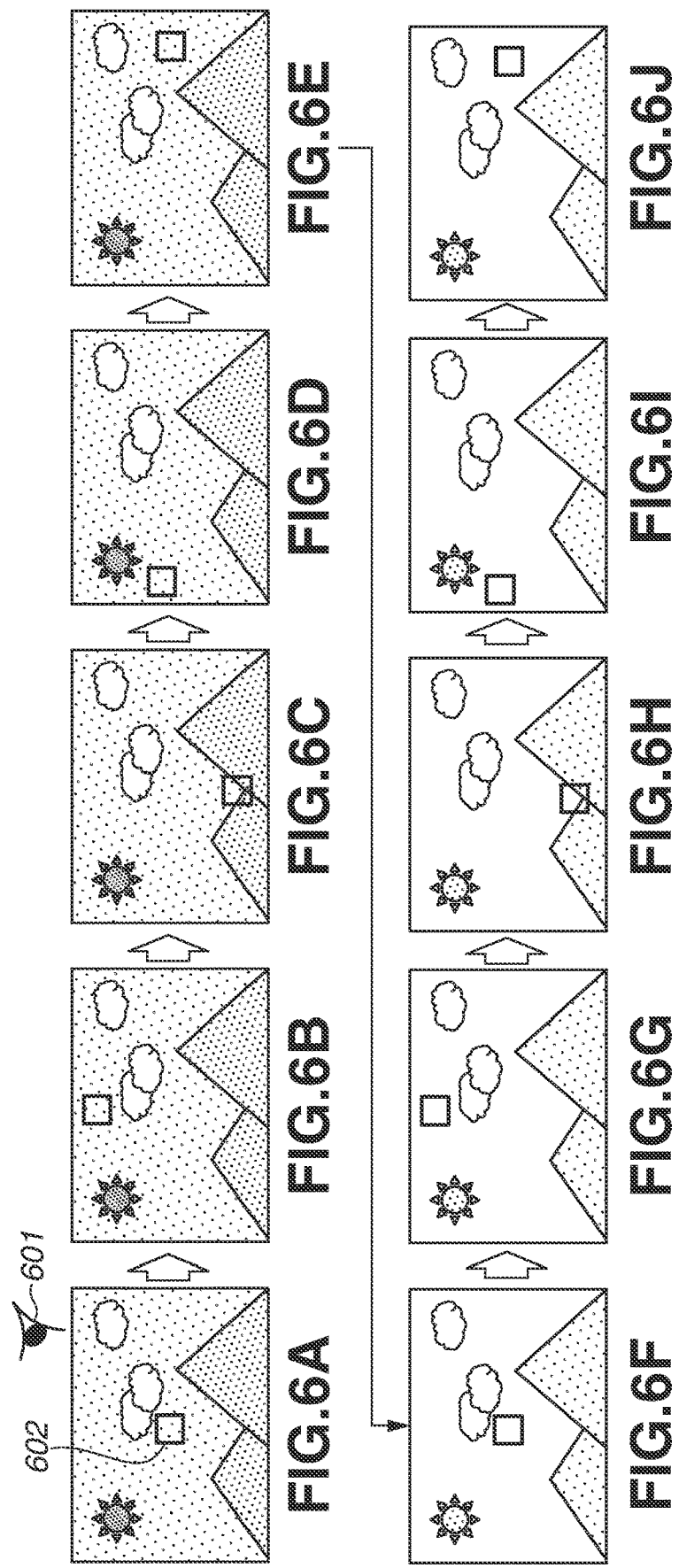

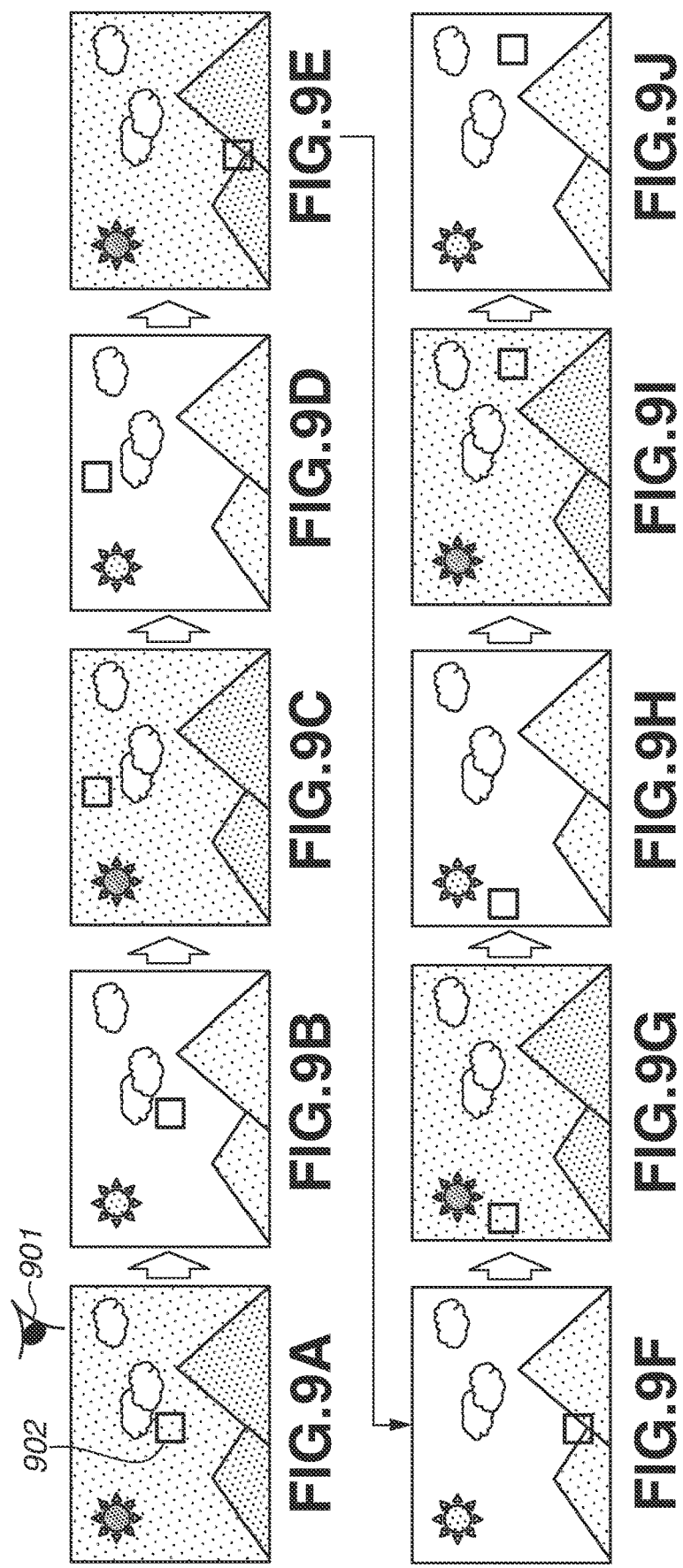

ELECTRONIC DEVICE, METHOD FOR CONTROLLING ELECTRONIC DEVICE, AND STORAGE MEDIUM

BACKGROUND

Field

The present disclosure relates to an electronic device, a method for controlling the electronic device, and a storage medium, and in particular, relates to an electronic device to which an eye gaze input based on a gaze of a user can be provided, a method for controlling the electronic device, and a storage medium.

Description of the Related Art

Conventionally, there has been discussed a camera that detects a gaze direction of an operator, or a user, detects which region (position) in a field of view of a viewfinder the operator observes, and controls an image capturing function such as automatic focus adjustment.

However, accuracy of detection of the gaze direction depends on the diameter of a pupil of an eye of the user, how the user looks into the viewfinder, and brightness of surroundings. Thus, calibration is performed in which a gaze position is acquired as data and the gaze position is corrected based on the acquired data.

Japanese Patent Application Laid-Open No. 05-088074 discusses a method for correcting an eye gaze detection position based on a deviation between a point of gaze and a gaze target while displaying a gaze target on a screen of a viewfinder and displaying surrounding colors (background colors) of the gaze target in a single color.

However, in Japanese Patent Application Laid-Open No. 05-088074, calibration is executed with the background colors represented only by a single color, namely black. Meanwhile, the diameter of the pupil of the eye changes depending on the brightness of the surroundings. This changes the detection position of the gaze. Thus, if the brightness changes, the accuracy of the detection of a gaze position may not be improved.

SUMMARY

According to various embodiments of the present disclosure, an electronic device includes an eye gaze detection unit configured to detect a gaze position of a user, and a control unit configured to change a luminance value of a background image displayed on a display unit in at least two steps. The control unit performs control to, when the luminance value is a first luminance value, change the luminance value from the first luminance value to a second luminance value after the eye gaze detection unit detects a plurality of gaze positions of the user including at least the gaze position of the user in a case where an item is displayed at a first position on the display unit and the gaze position of the user in a case where the item is displayed at a second position on the display unit. The eye gaze detection unit detects the gaze position of the user when the luminance value is the second luminance value.

Further features of the present disclosure will become apparent from the following description of exemplary embodiments with reference to the attached drawings.

BRIEF DESCRIPTION OF THE DRAWINGS

FIGS. 6A, 6B, 6C, 6D, 6E, 6F, 6G, 6H, 6I, and 6J are diagrams illustrating examples of screens displayed when calibration is executed according to the first exemplary embodiment.

FIGS. 9A, 9B, 9C, 9D, 9E, 9F, 9G, 9H, 9, and 9J are diagrams illustrating examples of screens displayed when calibration is executed according to the second exemplary embodiment.

DESCRIPTION OF THE EMBODIMENTS

Exemplary embodiments of the present disclosure will be described below with reference to the drawings.

Figure 1A:
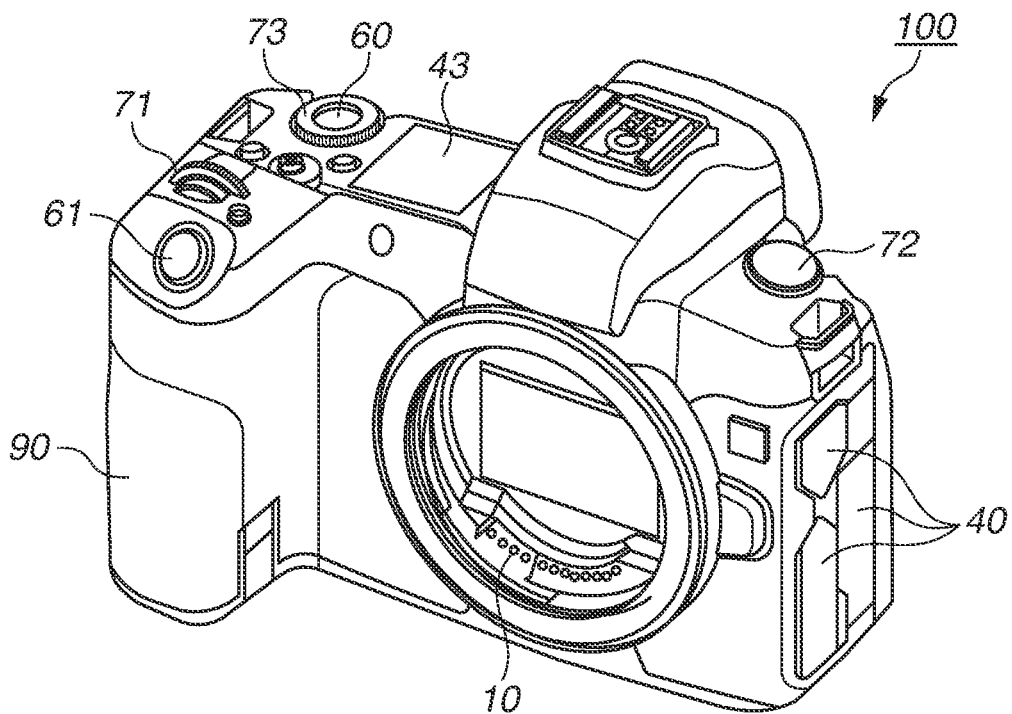
FIGS. 1A and 1B are external views of a camera according to a first exemplary embodiment.
Figure 1B:
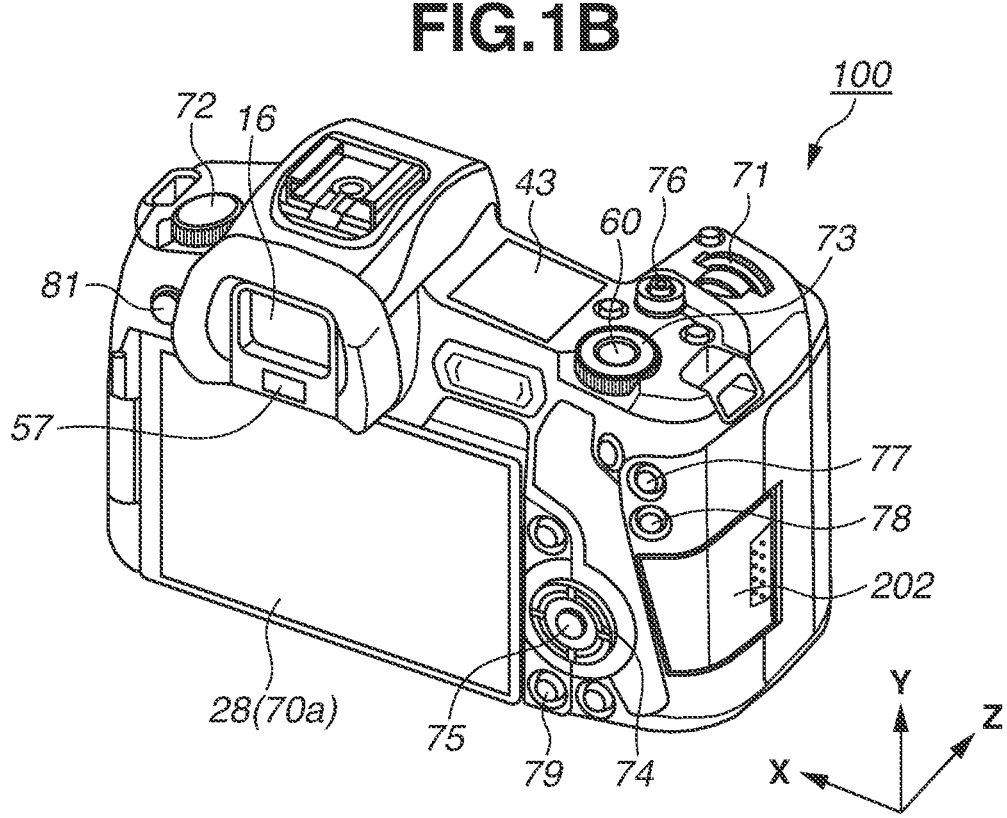

FIGS. 1A and 1B each illustrate an external view of a camera 100 as an example of an electronic device to which various embodiments of the present disclosure are applicable. FIG. 1A is a front perspective view of the camera 100 according to a first exemplary embodiment. FIG. 1B is a rear perspective view of the camera 100 according to the present exemplary embodiment.

In FIGS. 1A and 1B, a display unit 28 is provided on the back surface of the camera 100 and displays an image and various pieces of information. The display unit 28 includes a touch panel 70a having a function of an operation unit 70. The touch panel 70a can detect a touch operation on a display surface (operation surface) of the display unit 28. An outside-viewfinder display unit 43 is provided on an upper surface of the camera 100 and displays various setting values of the camera 100, such as the setting values of the shutter speed and the stop. A shutter button 61 is an operation unit for giving an image capturing instruction.

A mode selection switch 60 is included in the operation unit 70 and is used to switch various modes. A terminal cover 40 is a cover that protects a connector (not illustrated) to which a connection cable for connecting an external device with the camera 100 is connected. A main electronic dial 71 is a rotary operation member included in the operation unit 70. The main electronic dial 71 is rotated, whereby the setting values of the shutter speed and the stop can be changed.

A power switch 72 is an operation member for switching between power-on and power-off of the camera 100. A sub electronic dial 73 is a rotary operation member included in the operation unit 70 and enables movement of a selection frame and image feeding. A four-way operational key 74 is an operation member included in the operation unit 70 and including a push button that can be pushed in four directions. The four-way operational key 74 enables an operation in the direction in which the four-way operational key 74 is pressed. A Set button 75 is a push button included in the operation unit 70 and is mainly used to determine a selection item.

A moving image button 76 is used to give an instruction to start or stop capturing (recording) of a moving image. An automatic exposure (AE) lock button 77 is included in the operation unit 70. The AE lock button 77 is pressed in an image capturing standby state, whereby an exposure state can be fixed. An enlargement button 78 is an operation button included in the operation unit 70 and is used to turn on and off an enlargement mode in live view display in an image capturing mode. The enlargement mode is turned on, and then the main electronic dial 71 is operated, whereby a live view image can be enlarged and reduced. In a reproduction mode, the enlargement button 78 functions as an enlargement button for enlarging a reproduction image and increasing the enlargement ratio. A reproduction button 79 is an operation button included in the operation unit 70 and is used to switch between the image capturing mode and the reproduction mode. The reproduction button 79 is pressed in the image capturing mode, whereby the image capturing mode transitions to the reproduction mode, and the most recent image among images recorded in a recording medium 200 can be displayed on the display unit 28. A menu button 81 is included in the operation unit 70. The menu button 81 is pressed, whereby a menu screen on which various settings can be made is displayed on the display unit 28. A user can make various settings intuitively using the menu screen displayed on the display unit 28, the four-way operational key 74, and the Set button 75. A communication terminal 10 is a communication terminal for the camera 100 to communicate with a lens unit 150 (attachable to and detachable from the camera 100) described below.

An eyepiece portion 16 is an eyepiece portion of an eyepiece viewfinder (look-in type viewfinder). The user can visually check a video displayed on an electronic viewfinder (EVF) 29 in the eyepiece viewfinder through the eyepiece portion 16. An eye approach detection unit 57 is an eye approach detection sensor that detects whether an eye of an operator approaches the eyepiece portion 16. A cover 202 is a cover of a slot in which the recording medium 200 is plugged. A grip portion 90 is a holding portion having a shape that makes it easy for the user to grip the holding portion with the user's right hand when the user holds the camera 100. The shutter button 61 and the main electronic dial 71 are placed at positions where the user can operate the shutter button 61 and the main electronic dial 71 with the user's right index finger in a state where the user holds the camera 100 by gripping the grip portion 90 with the user's right little, ring, and middle fingers. The sub electronic dial 73 is placed at a position where the user can operate the sub electronic dial 73 with the user's right thumb in the same state.

Figure 2:
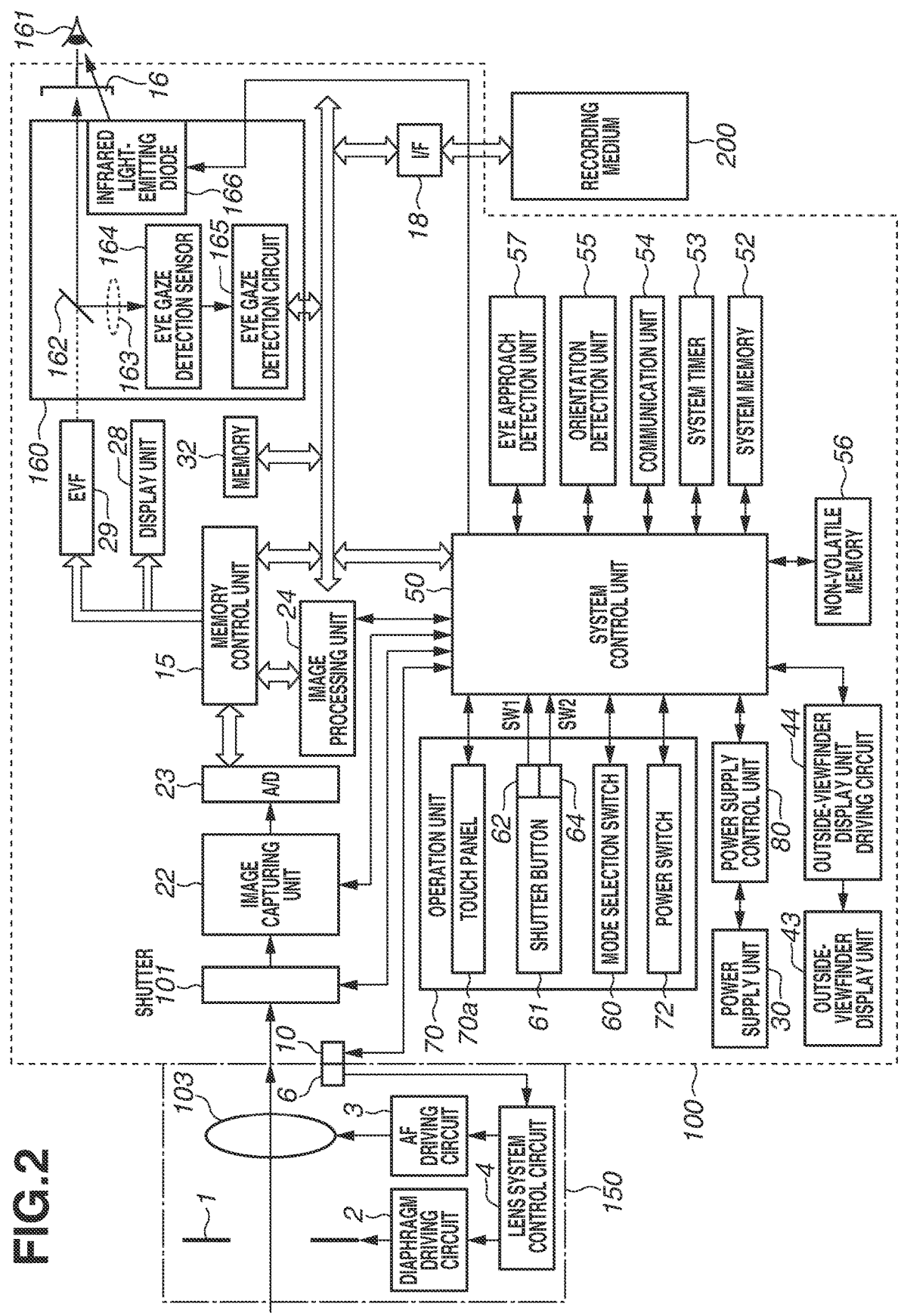
FIG. 2 is a block diagram illustrating a configuration of the camera according to the first exemplary embodiment.

FIG. 2 is a block diagram illustrating an example of a configuration of the camera 100 according to the present exemplary embodiment. The same components as those in FIG. 1 are designated by the same reference numerals, and the description of these components is appropriately omitted.

To the camera 100, a lens unit 150 is attached.

Although a lens 103 generally includes a plurality of lenses, FIG. 2 illustrates only a single lens in a simplified manner. A communication terminal 6 is a communication terminal for the lens unit 150 to communicate with the camera 100. A lens system control circuit 4 communicates with a system control unit 50 via the communication terminals 6 and 10 and controls a diaphragm 1 via a diaphragm driving circuit 2. Then, the lens system control circuit 4 displaces the lens 103 via an autofocus (AF) driving circuit 3, thereby bringing the lens 103 into focus.

A shutter 101 is a focal plane shutter capable of freely controlling an exposure time of an image capturing unit 22 under control of the system control unit 50.

The image capturing unit 22 is an image sensor including a charge-coupled device (CCD) or a complementary metal-oxide-semiconductor (CMOS) device, which converts an optical image into an electric signal. An analog-to-digital (A/D) converter 23 is used to convert an analog signal output from the image capturing unit 22 into a digital signal.

An image processing unit 24 performs a resizing process, such as predetermined pixel interpolation and reduction, and a color conversion process on data from the A/D converter 23 or data from a memory control unit 15.

The image processing unit 24 performs a predetermined calculation process using captured image data. The system control unit 50 performs exposure control and distance measurement control based on a calculation result obtained by the image processing unit 24. Consequently, an AF process, an AE process, and a pre-flash (EF) process are performed by a through-the-lens (TTL) method. Further, the image processing unit 24 performs a predetermined calculation process using captured image data and performs an auto white balance (AWB) process by the TTL method based on an obtained calculation result.

The memory control unit 15 controls transmission and reception of data between the A/D converter 23, the image processing unit 24, and a memory 32. Output data from the A/D converter 23 is written directly to the memory 32 via the image processing unit 24 and the memory control unit 15 or via the memory control unit 15. The memory 32 stores image data obtained by the image capturing unit 22 and converted into digital data by the A/D converter 23 and image data to be displayed on the display unit 28 or the EVF 29. The memory 32 has a sufficient storage capacity for storing a predetermined number of still images and a moving image and a sound of a predetermined length of time.

The memory 32 also serves as a memory for image display (video memory).

Image data for display written in the memory 32 is displayed on the display unit 28 or the EVF 29 via the memory control unit 15.

The display unit 28 or the EVF 29 performs display on a display device such as a liquid crystal display (LCD) or an organic electroluminescent (EL) display in response to a signal from the memory control unit 15 under control of the system control unit 50. Data is converted into digital data by the A/D converter 23, and the digital data is accumulated in the memory 32. Then, the data is sequentially transferred to and displayed on the display unit 28 or the EVF 29, whereby the display unit 28 or the EVF 29 can perform live view display (LV display). Hereinafter, an image displayed in live view will be referred to as a live view image (LV image).

An infrared light-emitting diode 166 is a light-emitting element for detecting the gaze position of the user in the screen of the viewfinder and emits infrared light to an eyeball (eye) 161 of the user whose eye approaches the eyepiece portion 16. The infrared light emitted from the infrared light-emitting diode 166 is reflected by the eyeball (eye) 161, and the reflected infrared light reaches a dichroic mirror 162. The dichroic mirror 162 reflects only infrared light and transmits visible light. The reflected infrared light of which an optical path is changed forms an image on an imaging surface of an eye gaze detection sensor 164 through an imaging lens 163. The imaging lens 163 is an optical member included in an eye gaze detection optical system. The eye gaze detection sensor 164 is an imaging device such as a CCD image sensor.

The eye gaze detection sensor 164 photoelectrically converts the reflected infrared light incident on the eye gaze detection sensor 164 into an electric signal and outputs the electric signal to an eye gaze detection circuit 165. The eye gaze detection circuit 165 includes at least one processor. Based on the output signal of the eye gaze detection sensor 164, the eye gaze detection circuit 165 detects the gaze position of the user from an image or a motion of the eyeball (eye) 161 of the user and outputs detection information to the system control unit 50. As described above, an eye gaze detection block 160 includes the dichroic mirror 162, the imaging lens 163, the eye gaze detection sensor 164, the infrared light-emitting diode 166, and the eye gaze detection circuit 165.

In the present exemplary embodiment, using the eye gaze detection block 160, the gaze is detected by a method termed a corneal reflection method. The corneal reflection method is a method for detecting the direction and the position of the gaze based on a positional relationship between reflected light obtained by particularly a cornea of the eyeball (eye) 161 reflecting the infrared light emitted from the infrared light-emitting diode 166, and a pupil of the eyeball (eye) 161. There are various other methods for detecting the direction and the position of the gaze, such as a method termed a scleral reflection method for using a difference in reflectance of light between the iris of the eye and the white of the eye. Alternatively, any method other than the above may be used as long as the method can detect the direction and the position of the gaze.

The outside-viewfinder display unit 43 displays various setting values of the camera 100, such as the setting values of the shutter speed and the stop, via an outside-viewfinder display unit driving circuit 44.

A non-volatile memory 56 is an electrically erasable and recordable memory. As the non-volatile memory 56, for example, a flash read-only memory (ROM) is used. The non-volatile memory 56 stores a constant for operation of the system control unit 50, a program, and various pieces of data. The program as used herein refers to a computer program for executing various flow charts described below in the present exemplary embodiment.

The system control unit 50 is an arithmetic processing unit (control unit) including at least one processor or circuit and controls the entire camera 100. The system control unit 50 executes the above-described program recorded in the non-volatile memory 56, thereby implementing processes described below in the present exemplary embodiment. As a system memory 52, for example, a random-access memory (RAM) is used. A constant and a variable for the operation of the system control unit 50 and the program read from the non-volatile memory 56 are loaded into the system memory 52. The system control unit 50 also controls the memory 32, the display unit 28, and the EVF 29, thereby performing display control. Further, the system control unit 50 controls the display unit 28 and the EVF 29 and thereby can change a luminance value of an image displayed on the display unit 28 and the EVF 29.

A system timer 53 is a time measurement unit that measures the time used for various types of control and the time of a built-in clock.

The operation unit 70 including the mode selection switch 60, a first shutter switch 62, and a second shutter switch 64 is an operation unit for inputting various operation instructions to the system control unit 50. The mode selection switch 60 is used to switch an operation mode of the system control unit 50 to either a still image capturing mode or a moving image capturing mode. The still image capturing mode includes an auto image capturing mode, an auto scene distinction mode, a manual mode, a stop priority mode (Av mode), a shutter speed priority mode (Tv mode), and a program AE mode (P mode). The still image capturing mode also includes various scene modes in which image capturing settings are made for respective image capturing scenes, and a custom mode. Using the mode selection switch 60, the user can directly switch to any one of the modes. Alternatively, using the mode selection switch 60, the user may once switch to a list screen of image capturing modes, then select any one of a plurality of modes displayed on the list screen, and switch to the selected mode using another operation member. Similarly, the moving image capturing mode may include a plurality of modes.

The first shutter switch 62 is turned on in an intermediate state of an operation, i.e., by a so-called half-pressing operation (image capturing preparation instruction) on the shutter button 61 provided in the camera 100 and generates a first shutter switch signal SW1. Based on the first shutter switch signal SW1, the system control unit 50 starts an image capturing preparation operation such as the AF process, the AE process, the AWB process, or the EF process.

The second shutter switch 64 is turned on by completion of an operation, i.e., by a so-called full-pressing operation (image capturing instruction) on the shutter button 61 and generates a second shutter switch signal SW2. Based on the second shutter switch signal SW2, the system control unit 50 starts a series of operations of an image capturing process from reading a signal from the image capturing unit 22 to writing a captured image as an image file to the recording medium 200.

The operation unit 70 is various operation members as an input unit that receives an operation from the user. The operation unit 70 includes the shutter button 61, the touch panel 70a, the main electronic dial 71, the power switch 72, the sub electronic dial 73, the four-way operational key 74, the Set button 75, the moving image button 76, the AE lock button 77, the enlargement button 78, the reproduction button 79, and the menu button 81.

A power supply control unit 80 includes a battery detection circuit, a direct-current-to-direct-current (DC/DC) converter, and a switch circuit for switching blocks to be applied with a current. The power supply control unit 80 detects the presence or absence of attachment of a battery, the type of the battery, and a remaining life of a battery. The power supply control unit 80 controls the DC/DC converter based on detection results thereof and an instruction from the system control unit 50 and supplies a required voltage to the components including the recording medium 200 for a required period. A power supply unit 30 includes a primary battery such as an alkaline battery or a lithium battery, a secondary battery such as a nickel-cadmium (NiCd) battery, a nickel-metal hydrate (NiMH) battery, or a lithium-ion (Li) battery, or an alternating current (AC) adapter.

A recording medium interface (I/F) 18 is an interface with the recording medium 200 such as a memory card or a hard disk. The recording medium 200 is a recording medium such as a memory card for recording a captured image and is composed of a semiconductor memory or a magnetic disk.

A communication unit 54 connects to an external device wirelessly or via a cable for a wired connection, and transmits and receives a video signal and a sound signal to and from the external device. The communication unit 54 can also connect to a wireless local area network (LAN) or the Internet. The communication unit 54 can communicate with the external device using Bluetooth® or Bluetooth® Low Energy. The communication unit 54 can transmit an image (including a live view image) captured by the image capturing unit 22 or an image recorded in the recording medium 200 to the external device and also receive an image or various other pieces of information from the external device.

An orientation detection unit 55 detects an orientation of the camera 100 relative to the direction of gravitational force. Based on the orientation detected by the orientation detection unit 55, the system control unit 50 can determine whether an image captured by the image capturing unit 22 is an image captured with the camera 100 held horizontally or an image captured with the camera 100 held vertically. The system control unit 50 can add orientation information according to the orientation detected by the orientation detection unit 55 to an image file of an image captured by the image capturing unit 22 or record the image by rotating the image based on the orientation detected by the orientation detection unit 55. As the orientation detection unit 55, an acceleration sensor or a gyro sensor can be used. Using the acceleration sensor or the gyro sensor as the orientation detection unit 55, the system control unit 50 can also detect a motion of the camera 100 (whether the camera 100 is panned, tilted, lifted, or at rest).

The eye approach detection unit 57 is an eye approach detection sensor that detects approach and separation of the eye (physical body) 161 with regard to the eyepiece portion 16 of the viewfinder. Based on a state detected by the eye approach detection unit 57, the system control unit 50 switches between a display state and a non-display state of the display unit 28 and the EVF 29.

More specifically, in a case whereat least the camera 100 is in an image capturing standby state and a display destination switching setting of a live view image captured by the image capturing unit 22 is an automatic switching setting, while the eye does not approach the eyepiece portion 16, the display destination is set to the display unit 28 and display of the display unit 28 is turned on, and the EVF 29 is set to the non-display state. While the eye approaches the eyepiece portion 16, the display destination is set to the EVF 29 and display of the EVF 29 is turned on, and the display unit 28 is set to the non-display state.

As the eye approach detection unit 57, for example, an infrared proximity sensor can be used. The eye approach detection unit 57 can detect approach of some kind of physical body to the eyepiece portion 16 of the viewfinder having the EVF 29 built-in. If the physical body approaches, infrared light projected from a light projection portion (not illustrated) of the infrared proximity sensor is reflected by the physical body. Then, the reflected infrared light is received by a light receiving portion (not illustrated) of the infrared proximity sensor. Depending on an amount of the received infrared light, it is also possible to determine at what distance from the eyepiece portion 16 the approaching physical body is (eye approach distance).

As described above, the eye approach detection unit 57 performs eye approach detection for detecting the distance of the physical body approaching the eyepiece portion 16 to the eyepiece portion 16. Then, a detection result is output to the system control unit 50. In the present exemplary embodiment, the light projection portion and the light receiving portion of the eye approach detection unit 57 are devices separate from the infrared light-emitting diode 166 and the eye gaze detection sensor 164. However, the infrared light-emitting diode 166 may also serve as the light projection portion of the eye approach detection unit 57. Further, the eye gaze detection sensor 164 may also serve as the light receiving portion. In a non-eye approach state, if a physical body approaching the eyepiece portion 16 within a predetermined distance from the eyepiece portion 16 is detected, the eye approach detection unit 57 detects that an eye has approached. In an eye approach state, if the physical body of which the approach has been detected moves away a predetermined distance or more from the eyepiece portion 16, the eye approach detection unit 57 detects that the eye has been separated. A threshold for detecting eye approach and a threshold for detecting eye separation may be different from each other, for example, by providing hysteresis. After an eye approach is detected, the eye approach state continues until an eye separation is detected. After the eye separation is detected, the non-eye approach state continues until another eye approach is detected. The infrared proximity sensor is merely an example of the eye approach detection unit 57, and another sensor may be employed as long as the sensor can detect the approach of an eye or a physical body that can be regarded as the eye approach.

Based on output from the eye gaze detection block 160, the system control unit 50 can detect the following operations and states.

New input (detection) of the gaze of the user whose eye approaches the eyepiece portion 16, i.e., a start of an eye gaze input.

The state where the user whose eye approaches the eyepiece portion 16 provides an eye gaze input.

The state where the user whose eye approaches the eyepiece portion 16 is gazing into the eyepiece portion 16.

Drop of the gaze that has been input by the user whose eye approaches the eyepiece portion 16, i.e., an end of the eye gaze input.

The state where the user whose eye approaches the eyepiece portion 16 does not provide any eye gaze input.

The gaze as used herein refers to a state where the gaze position of the user does not exceed a predetermined amount of movement within a predetermined time.

If the system control unit 50 detects the state where the user provides an eye gaze input or the state where the user gazes into the eyepiece portion 16, then based on a correspondence relationship between position information included in detection information from the eye gaze detection circuit 165 and display coordinates on the EVF 29, the system control unit 50 detects a gaze position on a display screen of the EVF 29. As described above, the system control unit 50 has the function of detecting the gaze position on the display screen and corresponds to an eye gaze detection unit.

The touch panel 70a and the display unit 28 are integrally formed.

For example, the touch panel 70a is configured so that transmittance of light does not hinder the display of the display unit 28. Then, the touch panel 70a is attached to an upper layer of the display surface of the display unit 28. Then, input coordinates on the touch panel 70a are associated with display coordinates on the display surface of the display unit 28. Consequently, a graphical user interface (GUI) is configured that gives the user an impression as if the user can directly operate a screen displayed on the display unit 28.

The system control unit 50 can detect the following operations on the touch panel 70a and the following states.

A new touch of a finger or a stylus pen that has not touched the touch panel 70a on the touch panel 70a, i.e., a start of the touch (hereinafter referred to as a touch-down).

The state where the finger or the stylus pen is touching the touch panel 70a (hereinafter referred to as a touch-on).

The state of moving the finger or the stylus pen while the finger or the stylus pen keeps touching the touch panel 70a (hereinafter referred to as a touch-move).

The state of releasing, from the touch panel 70a, the finger or the stylus pen having been touching the touch panel 70a, i.e., an end of the touch (hereinafter referred to as a touch-up).

The state where nothing touches the touch panel 70a (hereinafter referred to as a touch-off).

If the touch-down is detected, simultaneously, the touch-on is also detected. After the touch-down, normally, the touch-on continues to be detected unless the touch-up is detected. The touch-move is detected also in the state where the touch-on is detected. Even if the touch-on is detected, the touch-move is not detected if the touch position does not move. After the touch-up of all the fingers or the stylus pen having touched the touch panel 70a is detected, the touch-off is detected.

The system control unit 50 is notified, via an internal bus, of these operations and states as well as the coordinates of a position where the finger or the stylus pen touches the touch panel 70a. Based on the information of which the system control unit 50 is notified, the system control unit 50 determines what operation (touch operation) is performed on the touch panel 70a. In the case of touch-move, the system control unit 50 can also determine, based on changes in the coordinates of the position, the moving direction of the finger or the stylus pen moving on the touch panel 70a with respect to each of the vertical and horizontal components on the touch panel 70a. If the touch-move performed by a predetermined distance or more is detected, the system control unit 50 determines that a slide operation is performed. An operation of quickly moving a finger by some distance while the finger keeps touching the touch panel 70a and then releasing the finger from the touch panel 70a immediately after the quick movement is referred to as a flick. In other words, the flick is the operation of quickly moving the finger along the touch panel 70a in a flipping manner. If a touch-move performed by a predetermined distance or more at a predetermined speed or more is detected and a touch-up is detected immediately after the touch move, the system control unit 50 can determine that a flick is performed (can determine that the flick is performed subsequent to a slide operation). Further, a touch operation of simultaneously touching a plurality of places (e.g., two points) and bringing respective touch positions close to each other is referred to as a pinch-in, and a touch operation of moving the respective touch positions away from each other is referred to as a pinch-out. The pinch-out and the pinch-in are collectively referred to as a pinch operation (or simply as a "pinch").

The touch panel 70a may be a touch panel of any of various types such as a resistive type, a capacitive type, a surface acoustic wave type, an infrared type, an electromagnetic induction type, an image recognition type, and an optical sensor type. Some of the types employ a method of detecting the presence of a touch based on the presence of a contact between the finger or the stylus pen and the touch panel 70a, and other types employ a method of detecting the presence of a touch based on the presence of an approach of the finger or the stylus pen to the touch panel 70a. Either of the methods can be used.

If a touch-move operation is performed in an eye approach state, the user can set a method for specifying a position of a position indicator in response to the touch-move operation to either an absolute position specification or a relative position specification. For example, in a case where the position indicator is an AF frame and the absolute position specification is set, if the touch panel 70a is touched, an AF position associated with the touched position (coordinates input position) is set. More specifically, the coordinates of the position where the touch operation is performed are associated with the coordinates of the position on the display unit 28. On the other hand, in a case where the relative position specification is set, the coordinates of the position where the touch operation is performed are not associated with the coordinates of the position on the display unit 28. In the relative position specification, regardless of the position of the touch-down on the touch panel 70a, an AF position is moved from the currently set AF position in a moving direction of the touch-move by a distance corresponding to an amount of movement of the touch-move.

Next, a description is given of a method for performing a calibration process by an eye gaze input operation on the camera 100 according to the first exemplary embodiment.

Figure 3:
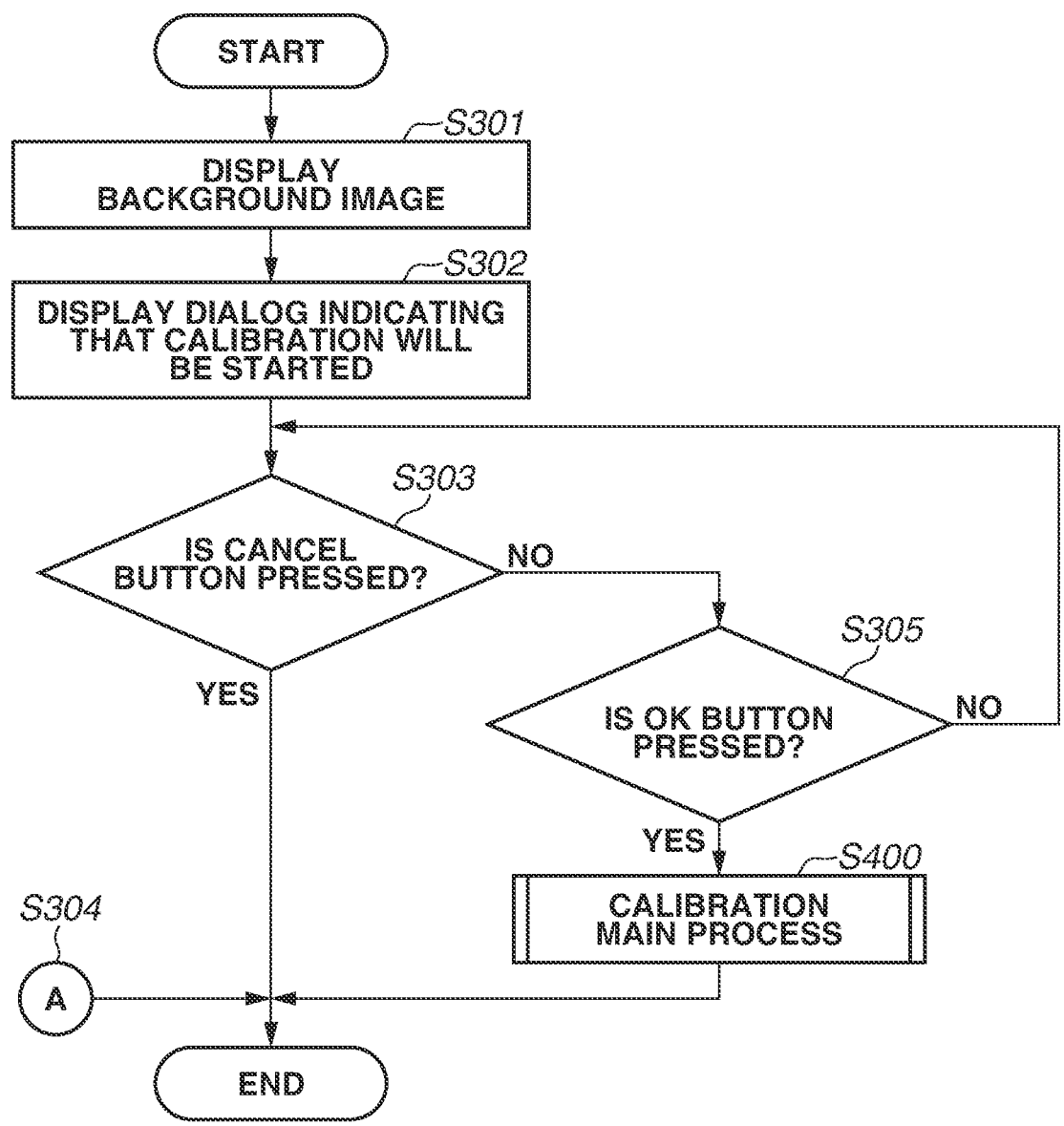
FIG. 3 is a flowchart illustrating a calibration process according to the first exemplary embodiment.

FIG. 3 is a flowchart illustrating a flow of a control process from a start to an end of a calibration of eye gaze detection according to the first exemplary embodiment. This control process and control processes in FIGS. 4 and 5 described below are implemented by the system control unit 50 loading a program stored in the non-volatile memory 56 into the system memory 52 and executing the program.

The flowchart in FIG. 3 is started in a case where the camera 100 is started up and the user selects a "calibration mode" as a setting mode in a menu and looks into the viewfinder, i.e., when the current state is an eye approach state where the eye approaches the eyepiece portion 16.

In step S301, the system control unit 50 displays a background image (LV image) on the EVF 29. The background image (LV image) is not limited to an image captured by the image capturing unit 22 and may be a monochromatic (e.g., white, black, or gray) image.

Figure 7A:
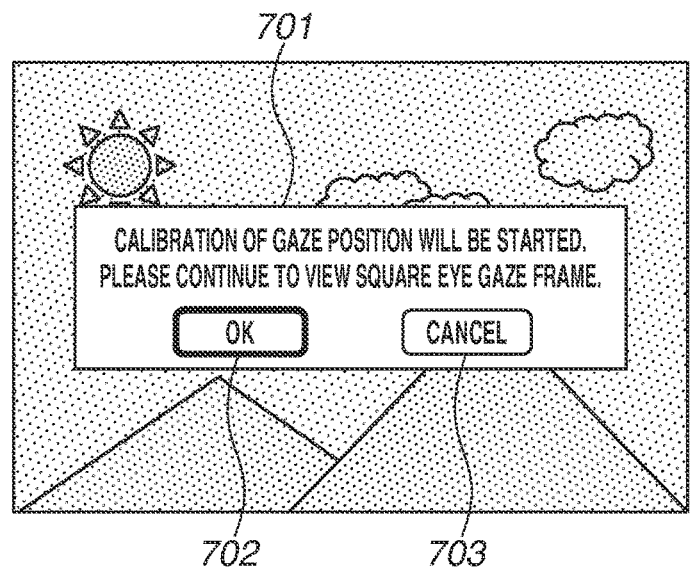
FIGS. 7A, 7B, and 7C are diagrams illustrating examples of message screens according to the first exemplary embodiment.

In step S302, the system control unit 50 displays, on the EVF 29, a dialog indicating a message that the calibration will be started (FIG. 7A). The dialog displays a button for giving an instruction to start the calibration mode (OK button) and a button for giving an instruction to end the calibration mode (cancel button). The user operates any button on the camera 100 or the touch panel 70a, thereby selecting these buttons.

In step S303, the system control unit 50 determines whether the button forgiving an instruction to end the calibration mode (cancel button) is pressed by the user. If the system control unit 50 determines that the cancel button is pressed (YES in step S303), the series of processes ends. If the system control unit 50 determines that the cancel button is not pressed (NO in step S303), the processing proceeds to step S305.

Figure 5:
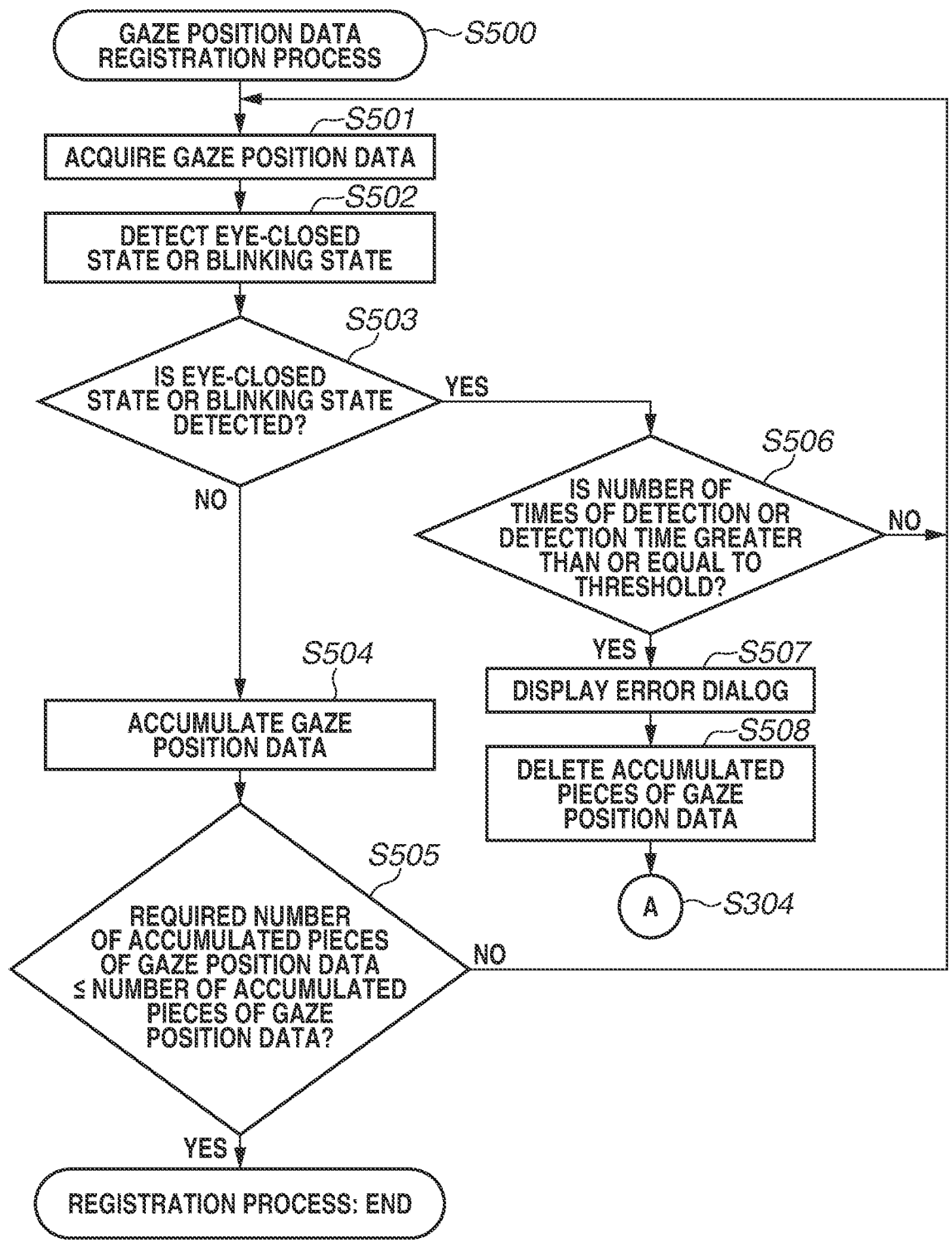
FIG. 5 is a flowchart illustrating a gaze position data registration process according to the first exemplary embodiment.

If the processing proceeds to step S304 from step S508 in FIG. 5, the calibration of eye gaze detection in FIG. 3 ends. A condition under which the processing proceeds to step S304 will be described below with reference to FIG. 5.

In step S305, the system control unit 50 determines whether the button forgiving an instruction to start the calibration mode (OK button) is pressed through a user operation. If the system control unit 50 determines that the OK button is pressed (YES in step S305), the processing proceeds to step S400 (calibration main process). If the system control unit 50 determines that the OK button is not pressed (NO in step S305), the processing returns to step S303. In this case, the message that the calibration will be started remains to be displayed on the EVF 29.

If the process of step S400 (calibration main process) ends, the series of processes ends.

If the calibration process normally ends in the calibration mode, the system control unit 50 stores, in the recording medium 200, gaze position data saved in the non-volatile memory 56 through a control process described in FIG. 5 in the calibration mode.

Figure 4:
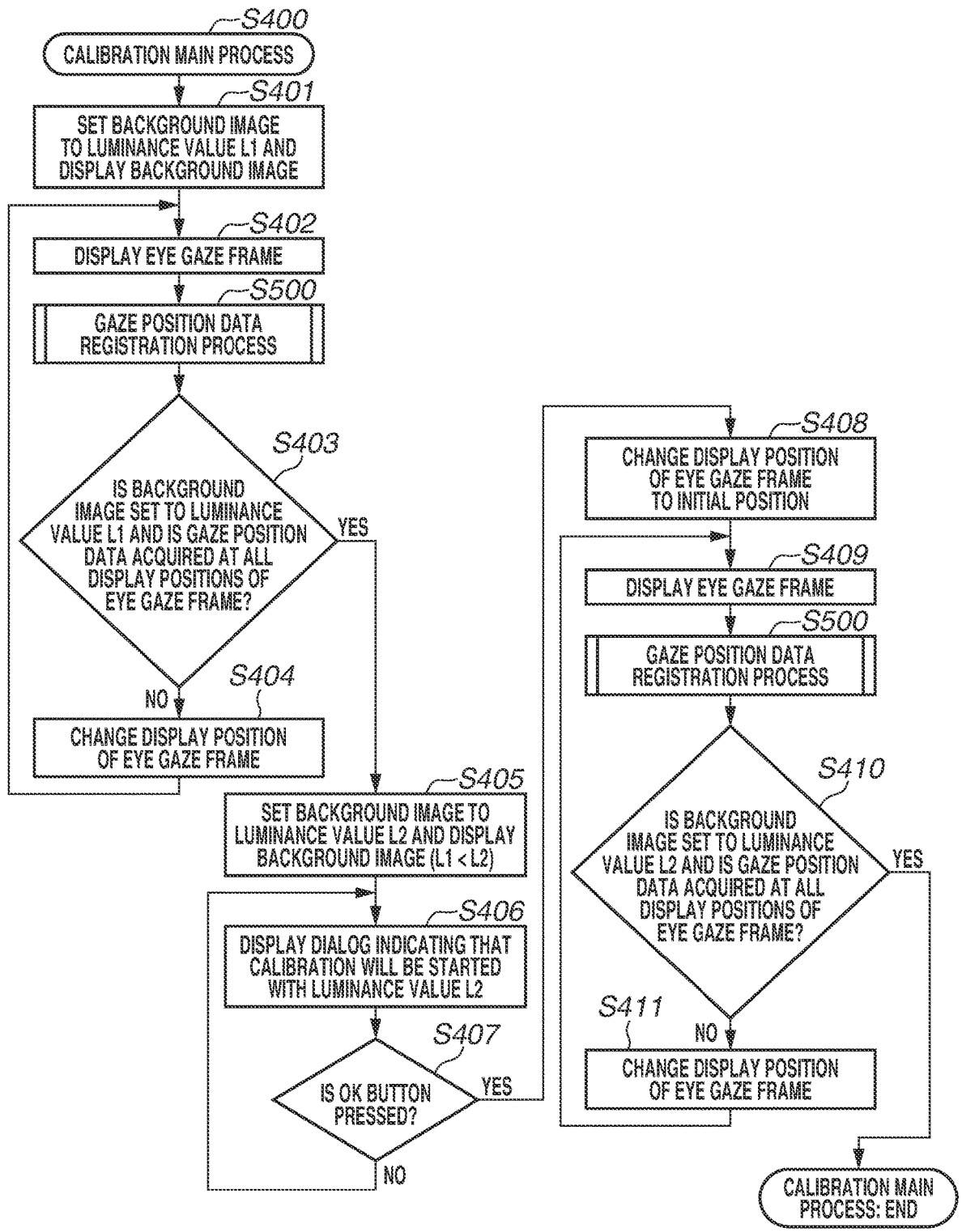
FIG. 4 is a flowchart illustrating a calibration main process according to the first exemplary embodiment.

Next, with reference to FIG. 4, a description is given of the calibration main process (step S400), which is a control process for changing display and luminance when the calibration is performed, according to the first exemplary embodiment.

FIG. 4 is a flowchart illustrating the calibration main process according to the first exemplary embodiment. The control process in FIG. 4 is the process of performing a gaze position data registration process while changing a display position of an eye gaze frame on the background image, and then changing a luminance value of the background image. The control process is executed after the system control unit 50 determines in step S305 in FIG. 3 that the OK button is pressed through a user operation.

In step S401, the system control unit 50 sets the background image (LV image) to a luminance value L1 and displays the background image (LV image) on the EVF 29. The method for controlling the setting of the luminance value L1 may be changed depending on an EVF display device. For example, there are a method for adjusting an amount of backlight for displaying the LV image on the EVF 29, a method for adjusting an amount of light to be transmitted through liquid crystals, and a method for adjusting an amount of light to be transmitted through a color filter (color luminance). Any of the methods may be used.

In step S402, the system control unit 50 displays an eye gaze frame, which is a frame in which the user is caused to fix the user's gaze, on the EVF 29. In the first exemplary embodiment, the shape of the eye gaze frame is a square shape as illustrated in FIGS. 6A, 6B, 6C, 6D, 6E, 6F, 6G, 6H, 6I, and 6J, but may be any shape as long as the user can fix the user's gaze on the shape. The eye gaze frame corresponds to an item in various embodiments of the present disclosure. Then, the processing proceeds to a gaze position data registration process in step S500. The details of the process of step S500 will be described below with reference to FIG. 5.

After the process of step S500 is executed, then in step S403, the system control unit 50 determines whether the background image (LV image) is set to the luminance value L1 and the process of registering gaze position data is completed at all the display positions of the eye gaze frame. More specifically, the system control unit 50 determines whether the eye gaze detection block 160 has acquired gaze information regarding the user at all the display positions of the eye gaze frame with the luminance value L. If the system control unit 50 determines that the registration of gaze position data is completed at all the display positions of the eye gaze frame (YES in step S403), the processing proceeds to step S405. If the system control unit 50 determines that the registration of gaze position data is not completed (NO in step S403), the processing proceeds to step S404.

In step S404, the system control unit 50 changes the display position of the eye gaze frame to another position. Then, the processing returns to step S402.

In step S405, the system control unit 50 sets the background image (LV image) displayed on the EVF 29 to a luminance value L2 and displays the background image (LV image). In the first exemplary embodiment, the eye is light-adapted taking into account strain on the eye due to the change in the luminance value and adaptation speed of the eye. More specifically, the luminance value L2 is greater than the luminance value L1, and a brighter image is displayed with the luminance value L2. Alternatively, the background image may be displayed first with high luminance, and after the acquisition of gaze position data is completed at all the positions, the luminance of the background image may be lowered. Generally, light adaptation takes shorter time than dark adaptation. Thus, as in the first exemplary embodiment, if the background image is displayed first with the low luminance, the user can adapt more quickly to the image after the luminance is changed. Thus, it is possible to perform the calibration more quickly.

Figure 7B:
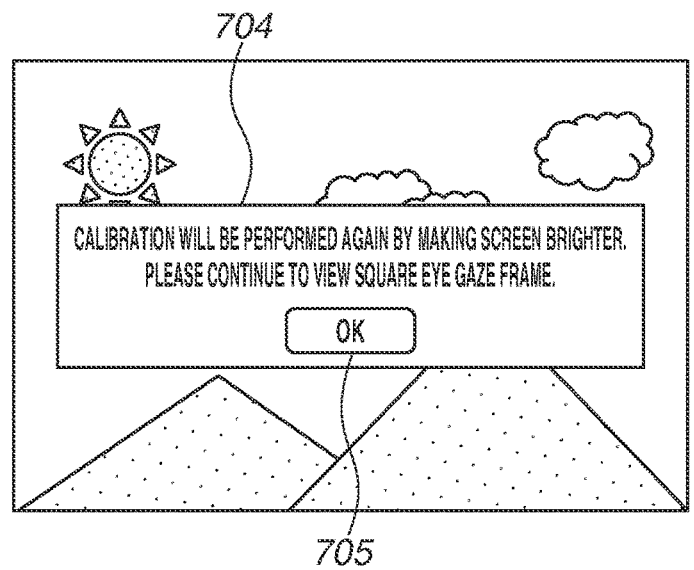

In step S406, the system control unit 50 displays, on the EVF 29, a dialog indicating a message that the calibration will be started again while the background image (LV image) is displayed with the luminance value L2 (FIG. 7B).

In step S407, the system control unit 50 determines whether the button forgiving an instruction to start the calibration (OK button) in the dialog is pressed through a user operation. If the system control unit 50 determines that the OK button is pressed (YES in step S407), the processing proceeds to step S408. If the system control unit 50 determines that the OK button is not pressed (NO in step S407), the processing returns to step S406.

In step S408, the system control unit 50 returns the display position of the eye gaze frame displayed on the EVF 29 to an initial position.

In step S409, the system control unit 50 displays the eye gaze frame on the EVF 29. Then, the processing proceeds to the gaze position data registration process in step S500.

After the process of step S500 is executed, then in step S410, the system control unit 50 determines whether the background image (LV image) is set to the luminance value L2 and the process of registering gaze position data is completed at all the display positions of the eye gaze frame. More specifically, the system control unit 50 determines whether the eye gaze detection block 160 has acquired eye gaze information regarding the user at all the display positions of the eye gaze frame with the luminance value L2. If the system control unit 50 determines that the registration of gaze position data is completed at all the display positions of the eye gaze frame (YES in step S410), the calibration main process ends. If the system control unit 50 determines that the registration of gaze position data is not completed (NO in step S410), the processing proceeds to step S411.

In step S411, the system control unit 50 changes the display position of the eye gaze frame to another position. Then, the processing returns to step S409.

FIG. 5 illustrates the flow of the gaze position data registration process, which is a registration process in which data on an gaze position is acquired as coordinates and the data is recorded in the non-volatile memory 56, in the calibration process.

In step S500, the system control unit 50 starts the gaze position data registration process.

In step S501, the system control unit 50 acquires a gaze position from the eye gaze detection block 160 while a gaze target is displayed. In the first exemplary embodiment, the system control unit 50 acquires the gaze position in a case where the eye gaze detection block 160 detects the output of a gaze state. Alternatively, if the system control unit 50 can acquire the gaze position without the user gazing, the acquired gaze position may be used.

In step S502, based on an acquisition result in step S501, the system control unit 50 detects an eye-closed state or a blinking state.

In step S503, the system control unit 50 determines whether the eye-closed state or the blinking state is detected.

If the system control unit 50 determines that the eye-closed state or the blinking state is detected (YES in step S503), the processing proceeds to step S506. If the system control unit 50 determines that the eye-closed state or the blinking state is not detected (NO in step S503), the processing proceeds to step S504.

In step S504, the system control unit 50 saves the data on the gaze position acquired in step S501 in association with the display position of the eye gaze frame in the non-volatile memory 56.

In step S505, the system control unit 50 determines whether the number of the pieces of data on the gaze positions saved in step S504 is greater than or equal to a predetermined threshold. If the system control unit 50 determines that the number of the pieces of data on the gaze positions is greater than or equal to the predetermined threshold (YES in step S505), the gaze position data registration process ends. Then, the processing returns to the calibration main process. If the system control unit 50 determines that the number of the pieces of data on the gaze positions is less than the predetermined threshold (NO in step S505), the processing returns to step S501. Then, data on a gaze position is acquired again.

In step S506, the system control unit 50 determines whether the time during which the eye-closed state or the blinking state is detected is greater than or equal to a predetermined time, or the number of times the eye-closed state or the blinking state is detected is greater than or equal to a predetermined number of times. If the system control unit 50 determines that the time during which the eye-closed state or the blinking state is detected is greater than or equal to the predetermined time or the number of times the eye-closed state or the blinking state is detected is greater than or equal to the predetermined number of times (YES in step S506), the processing proceeds to step S507. If the system control unit 50 determines that the time during which the eye-closed state or the blinking state is detected is less than the predetermined time or the number of times the eye-closed state or the blinking state is detected is less than the predetermined number of times (NO in step S506), the processing returns to step S501. In other words, in this case, the gaze position data is not saved. Then, data on a gaze position is acquired again.

Figure 7C:
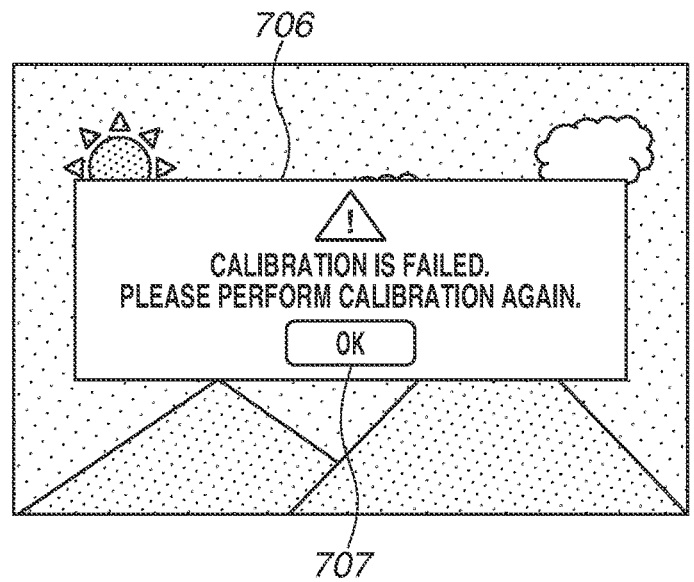

In step S507, the system control unit 50 displays, on the EVF 29, an error message that the calibration process is failed (FIG. 7C).

In step S508, the system control unit 50 deletes the pieces of gaze position data saved in the non-volatile memory 56 in the calibration mode.

The case where the processes of steps S507 and S508 are executed as a result of an error is not limited to a case where the number of times the eye-closed state or the blinking state is detected is greater than or equal to the predetermined number of times or a case where the time during which the eye-closed state or the blinking state is detected is greater than or equal to the predetermined time as in the first exemplary embodiment. The processes of steps S507 and S508 may be executed as a result of an error in a case where the eye of the user is moved away from the eyepiece portion 16 a case where the power supply of the camera 100 is turned off, and a case where the number of people allowed to perform the calibration or the memory size is exceeded.

After the process of step S508 is executed, the processing proceeds to step S304 in FIG. 3. Then, the series of the calibration process ends.

Next, with reference to FIGS. 6A, 6B, 6C, 6D, 6E, 6F, 6G, 6H, 6, and 6J, a description is given of an example of screen transition to perform calibration of a gaze position by changing the luminance value of the background image (LV image) according to the first exemplary embodiment.

FIGS. 6A to 6E illustrate display of the background image in the state where the luminance value is L1 (dark). FIGS. 6F to 6J illustrate display of the background image in the state where the luminance value is L2 (bright). The control processes described with reference to FIGS. 4 and 5 are executed, whereby the screen transitions.

An eye 601 of the user first continues to view, i.e., gazes at, an eye gaze frame 602 at a position illustrated in FIG. 6A for a predetermined time. If the eye 601 continues to view the eye gaze frame 602 displayed on the EVF 29 for the predetermined time, the system control unit 50 executes the gaze position data registration process in FIG. 5. The predetermined time is, for example, 1 second, 1.5 seconds, or 2 seconds. Then, through the process of step S404, the system control unit 50 changes the display position of the eye gaze frame 602 to a position in FIG. 6B. The user views the position of the eye gaze frame 602 illustrated in FIG. 6B, whereby the system control unit 50 performs the gaze position data registration process again.

In the first exemplary embodiment, display positions of the eye gaze frame are five portions, namely a center portion (FIGS. 6A and 6F), an upper end portion (FIGS. 6B and 6G), a lower end portion (FIGS. 6C and 6H), a left end portion (FIGS. 6D and 6I), and a right end portion (FIGS. 6E and 6J). The display positions of the eye gaze frame, the number of eye gaze frames, and display order of the eye gaze frame are not limited to these.

If the gaze position data registration process is completed up to FIG. 6E, then through the process of step S405, the system control unit 50 changes the background image (LV image) to the luminance value L2 and starts the registration of gaze position data again (FIGS. 6F to 6J). If the gaze position data registration process is completed up to FIG. 6J, the calibration process ends.

In the first exemplary embodiment, the display order of the eye gaze frame is the order illustrated in FIGS. 6A to 6E (FIGS. 6F to 6J), but is not limited to this. The eye gaze frame may be displayed in any order.

Next, with reference to FIGS. 7A, 7B, and 7C, a description is given of examples of message screens provided to the user when the calibration process is executed.

FIG. 7A illustrates an example of display of the message dialog displayed in step S302 and indicating that the calibration will be started.

A dialog 701 displays a message that the calibration will be started. A button (OK button) 702 for allowing the user to start the calibration and a button (cancel button) 703 for allowing the user to stop the calibration are also placed.

The message is displayed when the calibration starts, and the user is allowed to determine whether to start the calibration by a user operation, whereby it is possible to reduce the risk that the control processes are executed without the user's intention and the user is confused.

FIG. 7B illustrates an example of display of the message dialog displayed in step S406 and indicating to the user that the calibration will be started in the state where the background image (LV image) is set to the luminance value L2.

In the first exemplary embodiment, a calibration process for, in each of the states where the luminance value is set to different values such as L1 and L2, acquiring and accumulating pieces of gaze position data is performed. Consequently, it is possible to improve accuracy of a gaze position and reduce the number of times of working.

In the first exemplary embodiment, when the luminance is made high, the processes of steps S406 and S407 are performed, thereby notifying the user that the calibration needs to be performed again by changing the luminance value. Consequently, it is possible to prevent a shift in a gaze position due to light adaptation and a decrease in the detection accuracy due to eye closure.

Alternatively, the system control unit 50 may not display a message and may continue the calibration process after a predetermined time elapses. Yet alternatively, after the system control unit 50 displays the eye gaze frame and detects that the user gazes at the eye gaze frame, the system control unit 50 may continue the calibration process.

FIG. 7C illustrates an example of display of an error dialog displayed in step S507 and indicating to the user that the calibration process is failed. An error dialog 706 is displayed, whereby the user can recognize that the calibration process is failed. An OK button 707 provided in the error dialog 706 is pressed, whereby the calibration process ends.

A message (guidance or guide) displayed in the error dialog 706 is not limited to a message that the calibration process is failed. For example, a cause of the failure of the calibration process may be displayed in the error dialog 706 or another dialog different from the error dialog 706.

The OK button 707 is placed to end the calibration mode. Alternatively, another button may be placed instead of the OK button 707. The button may be pressed through a user operation, whereby the control processes may be executed so that the calibration process is performed again from the beginning.

Based on the calibration process according to the first exemplary embodiment as described above, the eye gaze frame is displayed at each display position in the state where the luminance value of the background image is set to L1, whereby gaze position data at each display position is registered. Then, the display position of the eye gaze frame is returned to the initial position, and the luminance value of the background image is changed to L2. Then, similarly, the eye gaze frame is displayed at each display position in the state where the luminance value of the background image is set to L2, whereby gaze position data at each display position is registered. This reduces the work load on the calibration of the gaze position. The calibration is performed using the registered gaze position data, whereby it is possible to improve the detection accuracy of the gaze position.

Next, with reference to FIGS. 8, 9A, 9B, 9C, 9D, 9E, 9F, 9G, 9H, 9, and 9J, a description is given of a method for performing a calibration process by an eye gaze input operation on a camera 100 according to a second exemplary embodiment. The calibration process according to the second exemplary embodiment is different from that according to the first exemplary embodiment in a calibration main process, which is a control process for changing display and luminance when the calibration is performed.

The calibration main process according to the first exemplary embodiment is the process of performing the gaze position data registration process while changing the display position of the eye gaze frame on the background image in the state where the background image is set to the same luminance value, and then changing the luminance value. On the other hand, the calibration main process according to the second exemplary embodiment is the process of performing an gaze position data registration process while changing the luminance value of the background image in the state where an eye gaze frame is displayed at the same position on the background image, and then changing the display position of the eye gaze frame. Differences from the first exemplary embodiment are described in detail below. A hardware configuration according to the second exemplary embodiment is similar to that of the camera 100 described with reference to FIGS. 1A, 1B, and 2. The control processes in FIGS. 3 and 5 are also similarly executed. Thus, portions similar to those in the first exemplary embodiment are designated by the same reference numerals, and are not described here.

Figure 8:
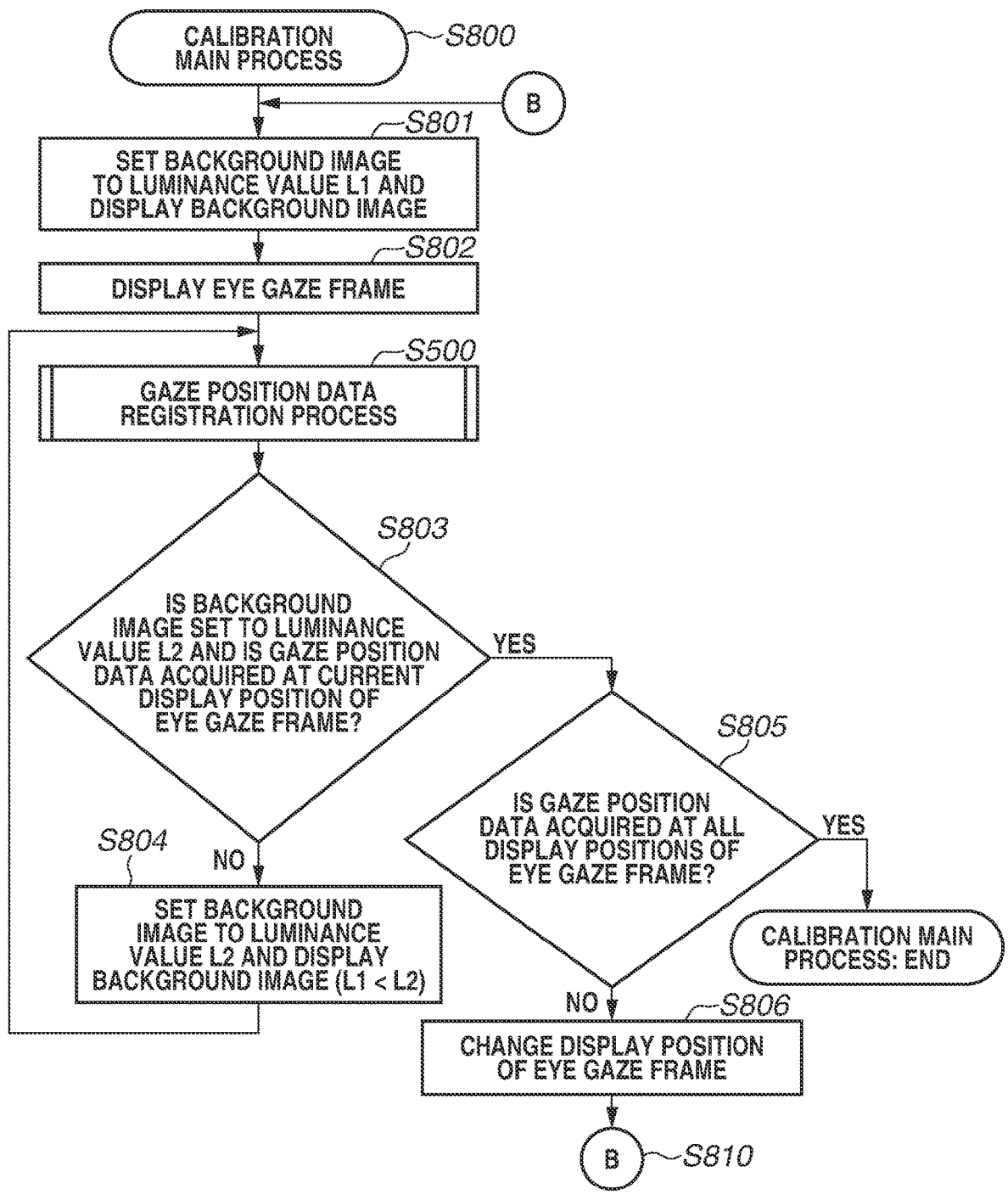
FIG. 8 is a flowchart illustrating a calibration main process according to a second exemplary embodiment.

FIG. 8 is a flowchart illustrating the calibration main process according to the second exemplary embodiment. The control process is executed after the system control unit 50 determines in step S305 in FIG. 3 that the OK button is pressed through a user operation. Similarly to the first exemplary embodiment, the control process in FIG. 8 is implemented by the system control unit 50 loading a program stored in the non-volatile memory 56 into the system memory 52 and executing the program.

In step S801, the system control unit 50 sets the background image (LV image) to a luminance value L1 and displays the background image (LV image) on the EVF 29. The method for controlling the setting of the luminance value L1 may be changed depending on an EVF display device. For example, there are a method for adjusting an amount of backlight for displaying the LV image on the EVF 29, a method for adjusting an amount of light to be transmitted through liquid crystals, and a method for adjusting an amount of light to be transmitted through a color filter (color luminance). Any of the methods may be used.

In step S802, the system control unit 50 displays an eye gaze frame, which is a frame on which the user is caused to fix the user's gaze, on the EVF 29. In the second exemplary embodiment, the shape of the eye gaze frame is a square shape as illustrated in FIGS. 9A, 9B, 9C, 9D, 9E, 9F, 9G, 9H, 9I, and 9J, but may be any shape as long as the user can fix the user's gaze on the shape. Then, the processing proceeds to a gaze position data registration process in step S500 (FIG. 5).

After the process of step S500 is executed, then in step S803, the system control unit 50 determines whether the background image (LV image) is set to a luminance value L2 and the process of registering gaze position data is completed at the current display position of the eye gaze frame. If the system control unit 50 determines that the registration of gaze position data is completed at the current display position of the eye gaze frame (YES in step S803), the processing proceeds to step S805. If the system control unit 50 determines that the registration of gaze position data is not completed at the current display position of the eye gaze frame (NO in step S803), the processing proceeds to step S804.

In step S804, the system control unit 50 sets the background image (LV image) displayed on the EVF 29 to the luminance value L2 and displays the background image (LV image). In the second exemplary embodiment, the eye is light-adapted taking into account strain on the eye due to the change in the luminance value and adaptation speed of the eye. More specifically, the luminance value L2 is greater than the luminance value L1, and a brighter image is displayed with the luminance value L2. Then, the processing proceeds to the gaze position data registration process in step S500.

Alternatively, the system control unit 50 may display, on the EVF 29, a dialog indicating a message that the calibration will be started again while the background image (LV image) is displayed with the luminance value L2 (FIG. 7B).

In step S805, the system control unit 50 determines whether the process of registering data on a gaze position is completed at all the display positions of the eye gaze frame. If the system control unit 50 determines that the registration of gaze position data is completed at all the display positions of the eye gaze frame (YES in step S805), the calibration main process ends. If the system control unit 50 determines that the registration of gaze position data is not completed at all the display positions of the eye gaze frame (NO in step S805), the processing proceeds to step S806.

In step S806, the system control unit 50 changes the display position of the eye gaze frame to another position. Then, the processing proceeds to step S810.

In step S810, the processing returns to step S801, and the processes of step S801 and subsequent steps are performed again.

With reference to FIGS. 9A, 9B, 9C, 9D, 9E, 9F, 9G, 9H, 9I, and 9J, a description is given of an example of screen transition to perform calibration of an gaze position by changing the luminance value of the background image (LV image) according to the second exemplary embodiment.

FIGS. 9A, 9C, 9E, 9G, and 9 illustrate display of the background image in the state where the luminance value is L1 (dark). FIGS. 9B, 9D, 9F, 9H, and 9J illustrate display of the background image in the state where the luminance value is L2 (bright). The control processes described with reference to FIGS. 5 and 8 are executed, whereby the screen transitions.

An eye 901 of the user first performs operation of continuing to view an eye gaze frame 902 at a position illustrated in FIG. 9A. If the eye 901 performs the operation of continuing to view the eye gaze frame 902, the system control unit 50 executes the gaze position data registration process in FIG. 5. Then, through the process of step S804, the system control unit 50 transitions the screen to FIG. 9B in which the background image is changed to the luminance value L2 while the eye gaze frame 902 is maintained at the same position as that in FIG. 9A. The user views the position of the eye gaze frame 902 illustrated in FIG. 9B, whereby the system control unit 50 performs the gaze position data registration process again.

In the second exemplary embodiment, display positions of the eye gaze frame are five portions, namely a center portion (FIGS. 9A and 9B), an upper end portion (FIGS. 9C and 9D), a lower end portion (FIGS. 9E and 9F), a left end portion (FIGS. 9G and 9H), and a right end portion (FIGS. 9I and 9J). The display positions of the eye gaze frame, the number of eye gaze frames, and the display order of the eye gaze frame are not limited to these.

As described above, in the calibration process according to the second exemplary embodiment, the luminance value of the background image is changed from L1 to L2 for the eye gaze frame displayed at the same position, whereby gaze position data with each luminance value is registered. Then, the display position of the eye gaze frame is changed, and the luminance value of the background image is changed to L1. Then, similarly, the luminance value of the background image is changed from L1 to L2 for the eye gaze frame displayed at the same position, whereby gaze position data with each luminance value is registered. Similarly to the first exemplary embodiment, this reduces the work load on the calibration of the gaze position. The calibration is performed using the registered gaze position data, whereby it is possible to improve the detection accuracy of the gaze position.

The various types of control performed by the system control unit 50 in the description may be performed by a single hardware component or by a plurality of hardware components (e.g., a plurality of processors or circuits) sharing the processing, thereby controlling the entire apparatus.

While the present invention has been described in detail based on its various exemplary embodiments, the present invention is not limited to these specific exemplary embodiments. The present invention also includes various other embodiments which can take different forms without departing from the spirit and scope of the invention.

For example, a description has been given of an example where a position movement instruction member used in combination with an eye gaze input is the touch panel 70a. Alternatively, another operation unit such as a button or a dial may be used. In the above exemplary embodiments, the display position is the AF frame. Alternatively, an icon frame or a parameter setting frame may be used, or an indicator different from the eye gaze frame, such as a mouse pointer, may be displayed. A criterion for determining a gaze is based on the time accumulated after an eye gaze input to the eye gaze detection block 160 starts. Alternatively, the accumulated time may be a time set in advance. The accumulated time may change based on the positional relationship between the displayed eye gaze frame and the gaze position, or may be arbitrarily set by the user. In the above exemplary embodiments, a gaze is used as an example of the criterion for determining a gaze position intended by the user. Alternatively, a gaze may not be used as the criterion for the determination. In the above-described exemplary embodiments, the calibration is performed using two steps of luminance, namely L1 (dark) and L2 (bright), for the background image. However, the number of steps in which the luminance value differs is not limited to two. Further, depending on the combination of luminance values to be set, it is possible to expect an improvement in the calibration accuracy.

In the above exemplary embodiments, a description has been given using, as an example, a case where various embodiments of the present disclosure are applied to the camera 100. However, the present invention is not limited to this example and may be applicable, for example, to any electronic device including a reception unit capable of receiving an eye gaze input. Further, the exemplary embodiments can be appropriately combined together. In the above exemplary embodiments, a configuration is employed in which the EVF 29 and eye gaze detection are used. Alternatively, the exemplary embodiments can also be carried out with a configuration in which a display device and the eye gaze detection are used. Furthermore, various embodiments of the present disclosure are applicable to a personal computer, a personal digital assistant (PDA), a mobile phone terminal, a mobile image viewer, a printer apparatus including a display, a digital photo frame, a music player, a game machine, an electronic book reader, and a wearable device such as a head-mounted display, for example.

It is noted that various embodiments of the present disclosure are applicable not only to an imaging apparatus main body but also to a control apparatus that communicates with an imaging apparatus (including, for example, a network camera) through wired or wireless communication and that remotely controls the imaging apparatus main body. Examples of an apparatus that remotely controls an imaging apparatus include a smartphone, a tablet personal computer (PC), and a desktop PC, for example. Based on operations performed in the control apparatus or processes performed in the control apparatus, in various embodiments, the control apparatus can notify the imaging apparatus of commands to perform various operations and make various settings, and thereby can remotely control the imaging apparatus. Further, the control apparatus may be able to receive a live view image captured by the imaging apparatus through wired or wireless communication and display the live view image.

OTHER EMBODIMENTS

Various embodiments of the present disclosure can also be implemented by performing a process of supplying software (program) for implementing the functions of the above exemplary embodiments to a system or an apparatus via a network or various storage media, and of causing a computer (or central processing unit (CPU) or microprocessor unit (MPU)) of the system or the apparatus to read and execute a program code. In such a case, the program and a storage medium that stores the program can constitute embodiments of the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In various embodiments of the present disclosure, it is possible to improve the detection accuracy of detecting the gaze position of a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-192894, filed Oct. 23, 2019, which is hereby incorporated by reference herein in its entirety.

What is claimed is:

1. An electronic device comprising:
an eye gaze detection unit configured to detect a gaze position of a user; and
a control unit configured to change a luminance value of a background image displayed on a display unit in at least two steps, the control unit performing control to, when the luminance value is a first luminance value, change the luminance value from the first luminance value to a second luminance value after the eye gaze detection unit detects a plurality of gaze positions of the user including at least the gaze position of the user in a case where an item is displayed at a first position on the display unit and the gaze position of the user in a case where the item is displayed at a second position on the display unit,
wherein the eye gaze detection unit detects the gaze position of the user when the luminance value is the second luminance value.

2. The electronic device according to claim 1, wherein, after the luminance value is changed to the second luminance value, the eye gaze detection unit detects a plurality of gaze positions of the user including at least the gaze position of the user in the case where the item is displayed at the first position on the display unit and the gaze position of the user in the case where the item is displayed at the second position on the display unit.

3. The electronic device according to claim 1, wherein the control unit performs control to display the item at the second position on the display unit upon detection of the gaze position of the user in the case where the item is displayed at the first position on the display unit.

4. The electronic device according to claim 1, wherein a position where the item is displayed on the display unit and the gaze position of the user detected by the eye gaze detection unit while the item is displayed are recorded in association with each other.

5. The electronic device according to claim 1, wherein the item is displayed in at least one of a center portion, an upper end portion, a lower end portion, a left end portion, and a right end portion of the display unit.

6. The electronic device according to claim 1, wherein the control unit performs control to change the luminance value by adjusting an amount of light of the display unit.

7. The electronic device according to claim 1, wherein the control unit performs control to change the luminance value in at least two steps from the first luminance value to the second luminance value higher than the first luminance value.

8. The electronic device according to claim 1, wherein the background image is a monochromatic image.

9. The electronic device according to claim 1, wherein the control unit performs control to change a color of the background image in at least two steps from black to white.

10. The electronic device according to claim 1, wherein the control unit performs control to, in a case where the luminance value is changed, notify the user that the gaze position is to be detected in a state where the luminance value is changed.

11. The electronic device according to claim 1, wherein the eye gaze detection unit detects the gaze position of the user in a case where a predetermined time has elapsed since the luminance value is changed or in a case where it is detected that the user gazes at the item.

12. The electronic device according to claim 1, wherein the control unit performs control to
(i) detect an eye-closed state based on a detection result of the eye gaze detection unit, and
(ii) where the number of times the eye-closed state is detected is greater than or equal to a predetermined number of times and/or where a time during which the eye-closed state is detected is greater than or equal to a predetermined time, display an error indication, the error indication indicating to delete recorded information regarding the gaze position, or to detect the gaze position again by the eye gaze detection unit without recording the information regarding the gaze position.

13. An electronic device comprising:
    an eye gaze detection unit configured to detect a gaze position of a user; and
    a control unit configured to change a luminance value of a background image displayed on a display unit in at least two steps, the control unit performing control so that, after the eye gaze detection unit detects the gaze position of the user in a case where the luminance value is a first luminance value and an item is displayed at a first position on the display unit, the eye gaze detection unit detects the gaze position of the user in a case where the luminance value is a second luminance value and the item is displayed at the first position on the display unit.

14. A method for controlling an electronic device, the method comprising:
    detecting a gaze position of a user; and
    changing a luminance value of a background image displayed on a display unit in at least two steps, and performing control to, when the luminance value is a first luminance value, change the luminance value from the first luminance value to a second luminance value after a plurality of gaze positions of the user including at least the gaze position of the user in a case where an item is displayed at a first position on the display unit and the gaze position of the user in a case where the item is displayed at a second position on the display unit is detected,
    wherein, the gaze position of the user is detected when the luminance value is the second luminance value.

15. A non-transitory computer-readable storage medium storing a program for causing a computer to execute the method for controlling an electronic device according to claim 14.

16. A method for controlling an electronic device, the method comprising:
    detecting a gaze position of a user; and
    changing a luminance value of a background image displayed on a display unit in at least two steps, and performing control so that, after the gaze position of the user is detected in a case where the luminance value is a first luminance value and an item is displayed at a first position on the display unit, the gaze position of the user is detected in a case where the luminance value is a second luminance value and the item is displayed at the first position on the display unit.

17. A non-transitory computer-readable storage medium storing a program for causing a computer to execute the method for controlling an electronic device according to claim 16.

\* \* \* \* \*